United States Patent
Kapat et al.

(10) Patent No.: US 10,598,093 B2
(45) Date of Patent: Mar. 24, 2020

(54) POWER GENERATION SYSTEM USING CLOSED OR SEMI-CLOSED BRAYTON CYCLE RECUPERATOR

(71) Applicant: UNIVERSITY OF CENTRAL FLORIDA RESEARCH FOUNDATION, INC., Orlando, FL (US)

(72) Inventors: Jayanta S. Kapat, Oviedo, FL (US); Jihua Gou, Orlando, FL (US); Narasimha Nagaiah, Orlando, FL (US); Joshua Schmitt, San Antonio, TX (US)

(73) Assignee: UNIVERSITY OF CENTRAL FLORIDA RESEARCH FOUNDATION, INC., Orlando, FL (US)

( * ) Notice: Subject to any disclaimer, the term of this patent is extended or adjusted under 35 U.S.C. 154(b) by 269 days.

(21) Appl. No.: 15/562,910

(22) PCT Filed: Mar. 31, 2016

(86) PCT No.: PCT/US2016/025117
§ 371 (c)(1),
(2) Date: Sep. 29, 2017

(87) PCT Pub. No.: WO2016/161052
PCT Pub. Date: Oct. 6, 2016

(65) Prior Publication Data
US 2018/0080382 A1  Mar. 22, 2018

Related U.S. Application Data

(60) Provisional application No. 62/141,962, filed on Apr. 2, 2015.

(51) Int. Cl.
*F02C 7/10* (2006.01)
*F02C 7/08* (2006.01)
(Continued)

(52) U.S. Cl.
CPC ............. *F02C 7/10* (2013.01); *F01K 25/103* (2013.01); *F02C 1/10* (2013.01); *F02C 7/08* (2013.01);
(Continued)

(58) Field of Classification Search
CPC ...... F02C 7/08; F02C 7/10; F02C 1/06; F02C 1/10; F23D 7/00; F23D 7/0008;
(Continued)

(56) References Cited

U.S. PATENT DOCUMENTS 3,579,982 A * 5/1971 Strub .................. F02C 1/10
60/667
3,847,211 A * 11/1974 Fischel .................. B01D 53/22
165/166
(Continued)

FOREIGN PATENT DOCUMENTS

| DE | 243 091 A1 | 2/1987 |
| WO | 94/10520 | 5/1994 |
| WO | 2014/152239 | 9/2014 |

OTHER PUBLICATIONS

Dostal et al., "A Supercritical Carbon Dioxide Cycle for Next Generation Nuclear Reactors," Advanced Nuclear Power Technology Program, MIT-ANP-TR-100; Mar. 10, 2004; 326 pages.
(Continued)

*Primary Examiner* — Steven M Sutherland
(74) *Attorney, Agent, or Firm* — Allen, Dyer, Doppelt + Gilchrist, P.A.

(57) ABSTRACT

A power generation system includes a turbine having an outlet. A high temperature recuperator has an inlet and is
(Continued)

connected to the turbine outlet. A low temperature recuperator is connected to the high temperature recuperator. Each of the high and low temperature recuperators include a plurality of matrix panels interconnected together that define hot fluid channels and cold fluid channels arranged adjacent to each other in a counterflow and stair-step configuration. A compressor is connected to the low temperature recuperator and turbine.

8 Claims, 11 Drawing Sheets

(51) Int. Cl.
| | | |
|---|---|---|
| F28F 1/04 | (2006.01) | |
| F28D 21/00 | (2006.01) | |
| F28F 7/02 | (2006.01) | |
| F02C 1/10 | (2006.01) | |
| F28D 9/00 | (2006.01) | |
| F28F 21/00 | (2006.01) | |
| F01K 25/10 | (2006.01) | |
| F28D 7/00 | (2006.01) | |

(52) U.S. Cl.
CPC ......... *F28D 7/0025* (2013.01); *F28D 9/0037* (2013.01); *F28D 21/001* (2013.01); *F28F 1/04* (2013.01); *F28F 1/045* (2013.01); *F28F 7/02* (2013.01); *F28F 21/00* (2013.01); *F05D 2230/50* (2013.01); *F05D 2240/40* (2013.01); *F28D 2021/0026* (2013.01); *F28F 2275/061* (2013.01)

(58) Field of Classification Search
CPC .... F23D 7/0025; F23D 7/0031; F23D 7/0037; F28D 9/00; F28D 9/0025; F28D 9/0031; F28D 9/0037; F28D 1/02; F28D 1/0233; F28D 1/03; F28D 1/0358; F28D 1/0308; F28D 2001/026; F28F 1/04; F28F 1/045; F28F 1/06; F28F 1/02; F28F 1/08; F28F 1/10; F28F 3/08; F28F 3/12
USPC .............................. 165/41, 42, 51, 164, 165
See application file for complete search history.

(56) References Cited

U.S. PATENT DOCUMENTS

| | | | |
|---|---|---|---|
| 4,347,896 A * | 9/1982 | Rosman | F28D 9/0018 |
| | | | 165/166 |
| 4,768,586 A | 9/1988 | Berneburg et al. | |
| 6,622,470 B2 | 9/2003 | Viteri et al. | |
| 7,685,820 B2 | 3/2010 | Litwin et al. | |
| 9,388,817 B1 * | 7/2016 | Wright | F02B 39/10 |
| 2002/0124569 A1 | 9/2002 | Treece et al. | |
| 2002/0148599 A1 | 10/2002 | Kaemmler et al. | |
| 2005/0217837 A1 | 10/2005 | Kudija, Jr. | |
| 2007/0284095 A1 * | 12/2007 | Wang | F28D 7/10 |
| | | | 165/166 |
| 2014/0103661 A1 | 4/2014 | Kacludis et al. | |
| 2014/0326432 A1 * | 11/2014 | Dean | F28D 9/0037 |
| | | | 165/54 |

OTHER PUBLICATIONS

Mohagheghi et al., "Pareto-Based Multi-Objective Optimization of Recuperated S—CO2, Brayton Cycles," Proceedings of ASME Turbo Expo Conference; Dusseldorf, Germany; Jun. 16-20, 2014; pp. 1-11.

Wright et al., "Overview of Supercritical CO2 Power Cycle Development at Sandia National Laboratories," 2011 University Turbine Systems Research Workshop; Columbus, Ohio; Oct. 25-27, 2011; 30 pages.

* cited by examiner

| PROPERTY | UNITS | 3M NEXTEL 720 | SPECIALTY MATERIAL SCS-UTRA | MATECH SiC-1900X | TORAY M30S |
|---|---|---|---|---|---|
| USE TEMPERATURE | °C | 1204 | 1371 | ~1482 | 300~350 |
| FILAMENT DIAMETER | μm | 10-12 | 142 | 10-12 | 5 |
| DENSITY | g/cc | 3.4 | 3.08 | 3.14 | 1.73 |
| TENSILE STRENGTH | MPa | 2930 | 3900 | 2500 | 5490 |
| TENSILE MODULUS | GPa | 260 | 380 | 367 | 294 |
| COMPOSITION | - | $Al_2O_2$ $SiO_2$ | SiC | $\beta$ – SiC | C |
| THERMAL EXPANSION | Ppm/°C | 6.0 | 4.1 | - | <2 |

FIG. 9

| PROPERTY | UNITS | MATRIX FORMED FROM POLYSILOXANE (PSO, STARFIRE SYSTEM SPR688) | MATRIX FORMED FROM POLYCARBOSILANE (PCS, STARFIRE SYSTEM SMP-10) |
|---|---|---|---|
| OPERATING TEMPERATURE | °C | 1,100 | 1,800 |
| DENSITY | g/cm$^3$ | 1.11 | 0.98 |
| COMPOSITION | - | SiOC | SiC |

POWER GENERATION SYSTEM USING CLOSED OR SEMI-CLOSED BRAYTON CYCLE RECUPERATOR

RELATED APPLICATION(S)

This is a PCT application based on U.S. provisional patent application No. 62/141,962 filed Apr. 2, 2015, the disclosure which is hereby incorporated by reference in its entirety.

FIELD OF THE INVENTION

This invention relates to heat exchange systems that use the Brayton cycle, and more particularly, this invention relates to a closed or semi-closed Brayton power generation system that uses a recuperator.

BACKGROUND OF THE INVENTION

Power plants, gas turbine engines and other heat engines using the Brayton cycle can benefit from heat exchangers. In $SCO_2$ Brayton Cycle exhaust gases are reused at the intake, and thus, form a closed or semi-closed system. A recuperator may be used as a heat exchanger in such systems and may operate as a counterflow energy recovery device. The recuperator is usually positioned within the supply and exhaust air streams to recover waste heat and increase the overall efficiency of the $SCO_2$ Brayton cycle. The gases are preheated using the recuperator to transfer waste heat from the exhaust and to the compressed air, which is preheated so less fuel is required for heating the gases to a turbine operating temperature. In a closed or semi-closed Brayton cycle recuperator, the working fluid such as $CO_2$ is recirculated. The air expelled from the turbine is reintroduced to the compressor. The heat exchanger as a recuperator pre heat the working fluid before it is introduced to combustion chamber. Some systems may include a high temperature recuperator and a low temperature recuperator.

Some power generation systems use supercritical carbon dioxide ($S-CO_2$) as the working fluid. It is desirable in some of those systems, for example, using the current heat exchangers in some conventional power plants, to scale the systems without disrupting the long-term operation of the system. Many heat exchangers as recuperators are not easily scalable and are used in moderate temperature and pressure ranges, and therefore, are not robust. To scale up a current heat exchanger in some power plants would disrupt the entire system.

SUMMARY OF THE INVENTION

A power generation system includes a turbine having an outlet. A high temperature recuperator has an inlet and is connected to the turbine outlet. A low temperature recuperator is connected to the high temperature recuperator. Each of the high and low temperature recuperators include a plurality of matrix panels interconnected together and defining hot fluid channels and cold fluid channels arranged adjacent to each other in a counterflow and stair-step configuration. A compressor is connected to the low temperature recuperator and turbine. The power generation system may be a supercritical carbon dioxide turbine.

The matrix panels may be interconnected together to define the hot and cold fluid channels in each of the high and low temperature recuperators as geometrically shaped in either a rectangular, elliptical, oval or rhombus configuration. The diffusion bond between adjacent matrix panels secure respective matrix panels together. Each matrix panel may comprise a fiber reinforced ceramic matrix panel. Each matrix panel may comprise a polymer derived ceramics composite.

Each of the respective hot or cold fluid channels may be surrounded by fluid channels carrying the respective other cold or hot fluid. Each of the respective hot or cold fluid channels may be surrounded by four fluid channels on four sides carrying the other respective cold or hot fluid. Each recuperator may include a longitudinal axis and an inlet and outlet end along the axis. The matrix panels may extend in a direction diagonal to the longitudinal axis and straighten at the inlet and outlet end. Each matrix panel may comprise polysiloxane or polycarbosilane.

A recuperator for a power generation system includes a recuperator body having an inlet and outlet and a plurality of matrix panels interconnected together and defining hot fluid channels and cold fluid channels from the inlet to the outlet and arranged adjacent to each other in a counterflow and stair-step configuration. Each of the hot or cold fluid channels are surrounded by fluid channels carrying the respective other cold or hot fluid and geometrically shaped in either a rectangular, elliptical, oval or rhombus configuration. The matrix panels may have a wall configuration that includes one of at least ribs, dimples and a roughed surface to create turbulence.

BRIEF DESCRIPTION OF THE DRAWINGS

Other objects, features and advantages of the present invention will become apparent from the detailed description of the invention, which follows when considered in light of the accompanying drawings in which.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

It should be understood that the power generation system as described can be used for different power and turbine systems that use different heat exchange systems. One example includes a S—$CO_2$ Brayton cycle turbine. It can be used wherever there is a need for heat exchange, in particular, at high temperatures.

The power generation system, in accordance with a non-limiting example, uses at least one recuperator that has matrix panels that are designed to enable modular construction of micro-channel recuperators having a high level of robustness to withstand high pressure in S—$CO_2$ (supercritical $CO_2$) power plants. This design facilitates a scale up to many sizes with little or no redesign of the entire turbine system and its recuperator. Parts for the system may be relatively easy to manufacture due to its simplicity of design and should decrease the manufacturing costs significantly. The design ensures natural separation of the hot and cold fluids, thus, eliminating any fluid leakage and mixing between hot and cold fluids. Fusion welding may be used to hold different layers of the matrix panels together to form the recuperator. In the system, a low temperature recuperator and high temperature recuperator are connected together. Each recuperator defines a longitudinal axis and an inlet and outlet along the longitudinal axis. Matrix panels extend in a direction diagonal to the longitudinal axis and straighten at the inlet and outlet end. Each end of the recuperator forming a heat exchanger includes these individual plates or matrix panels that straighten where the hot and cold fluids exit or enter in a direction diagonal to original square plates to maintain a counterflow configuration. The hot and cold fluid channels are geometrically shaped in either a rectangular, elliptical, and/or rhombus configuration. Each may be surrounded by four channels on four sides carrying the other respective hot or cold fluid. Thus, the hot fluid channels are adjacent cold fluid channels and arranged in a counterflow and stair-step configuration.

Figure 1:
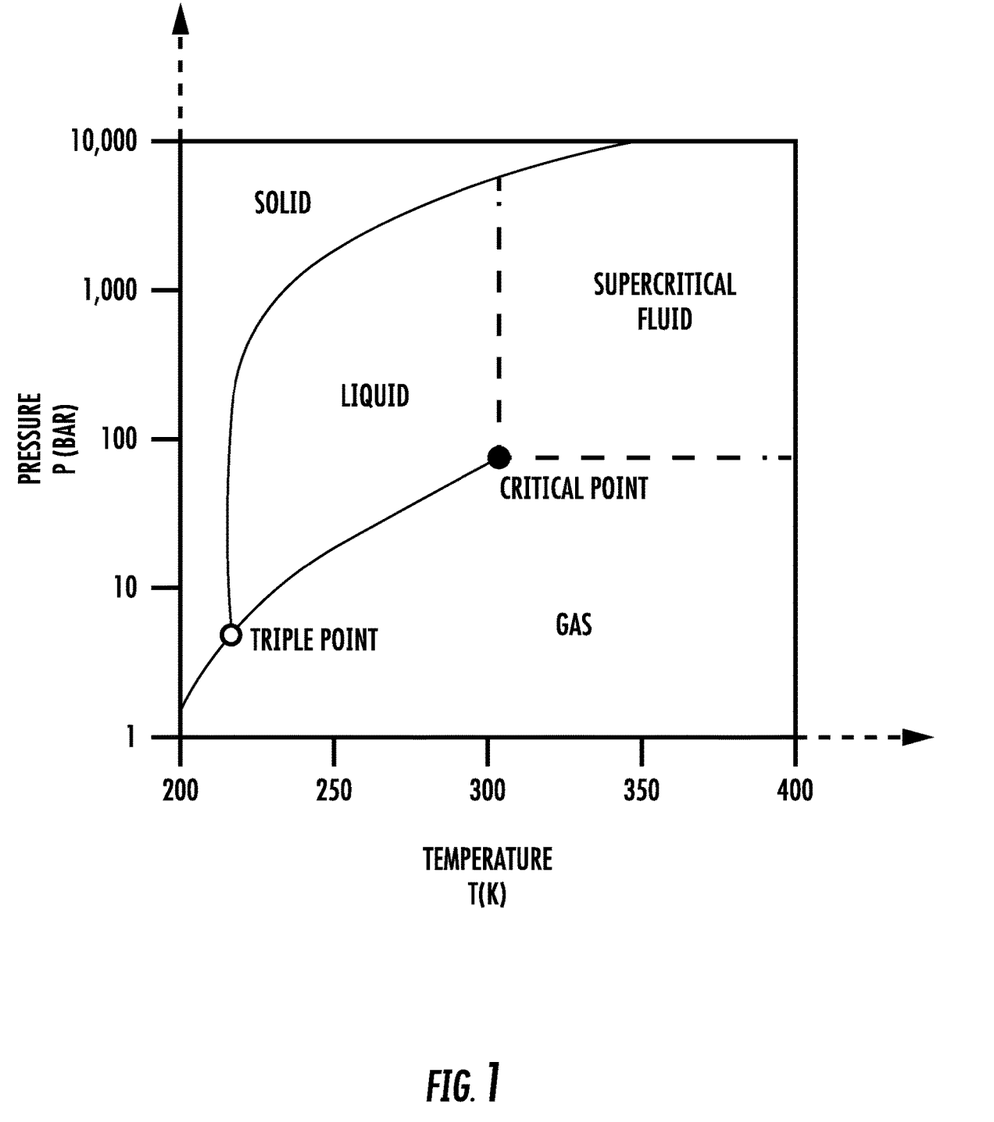
FIG. 1 is a representative $CO_2$ phase diagram showing the triple point, critical point, and supercritical region.

An emerging technology in the power industry is the use of power cycles using supercritical carbon dioxide (S—$CO_2$) as the working fluid. The supercritical point of carbon dioxide is about 304.25 K and 7.39 MPa (87.98° F. and 1072 psi), which is advantageous when the carbon dioxide is used with turbomachinery incorporating a heat exchanger such as a recuperator. The $CO_2$ fluid may transition to a supercritical state at approximately room temperature, allowing practical heat rejection to the environment. Supercritical fluids such as $CO_2$ fill their available volume, like a gas. This gas can flow through a turbo-expander and produce work using the same design methods as steam and gas turbines. An example $CO_2$ phase diagram is shown in FIG. 1.

The supercritical carbon dioxide is a fluid state of the carbon dioxide and it is held at or above its critical temperature and critical pressure. The graph shows the triple point at the intersection of the solid, liquid and gas phases and the critical point at the intersection of the gas, liquid and supercritical fluid phase. It is possible to replace steam in a power generation system with supercritical carbon dioxide that may be more thermally efficient. Thus, the term "supercritical" describes carbon dioxide above its critical temperature and pressure as about 31° C. and 73 atmospheres. The carbon dioxide has a density similar to its liquid state. In its supercritical state, carbon dioxide is nearly twice as dense as steam and results in a high power density and is easier to compress than steam. Under these power generation circumstances, a generator may extract power from the turbine at higher temperatures. Thus, the overall turbine design may be more simple and smaller than a steam equivalent.

Figure 2:
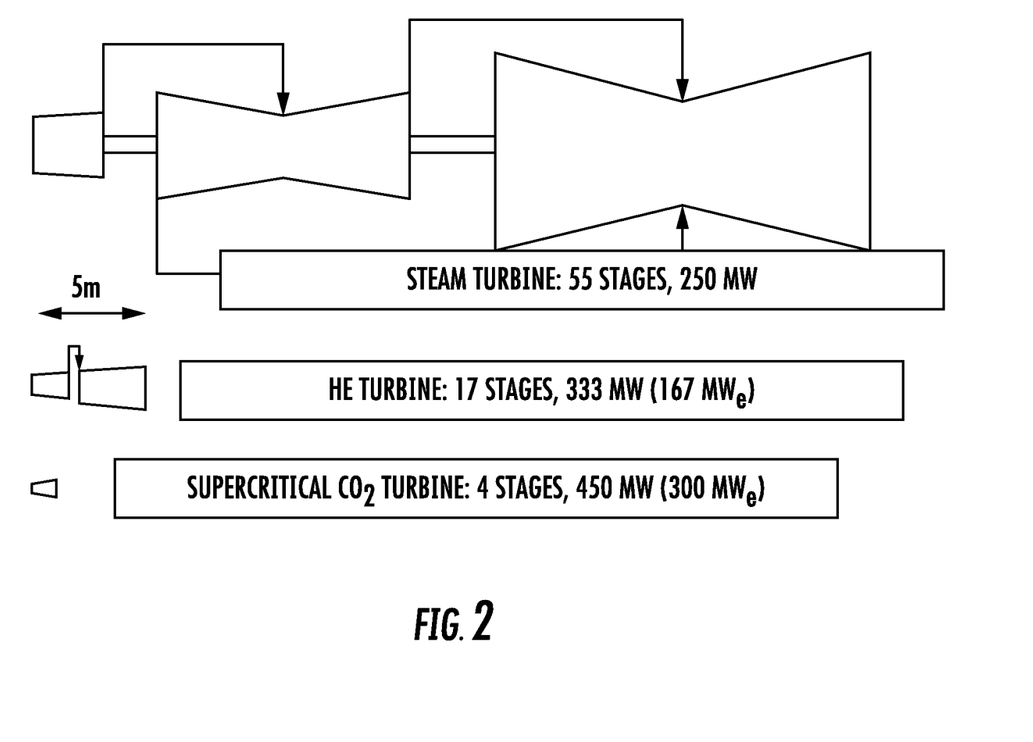
FIG. 2 is a fragmentary and schematic drawing view of steam, helium and supercritical $CO_2$ turbomachinery and showing their relative size.

The high pressure requirement of a supercritical $CO_2$ power generation turbine system can make recuperator design as a heat exchanger complicated. Even with a modest pressure ratio of 2.5, the high pressure stream may be up to 24.0 MPa (3480 psi) in an example. In a recuperator formed as a shell and tube heat exchanger, the inner, high-pressure tubes usually require thick walls, impeding heat exchange. A recuperator using small micron channels instead would help reduce the distributed force per channel, the internal shear stress, and the required wall thickness. A micro-channel heat exchanger as a recuperator is ideal for a supercritical $CO_2$ power generation turbine systems. FIG. 2 is a drawing from a MIT dissertation showing a comparison between different turbine designs and showing the much smaller size of a supercritical $CO_2$ power generation turbine compared to current designs of a heat turbine and a steam turbine used in typical power generation systems.

Figure 3A:
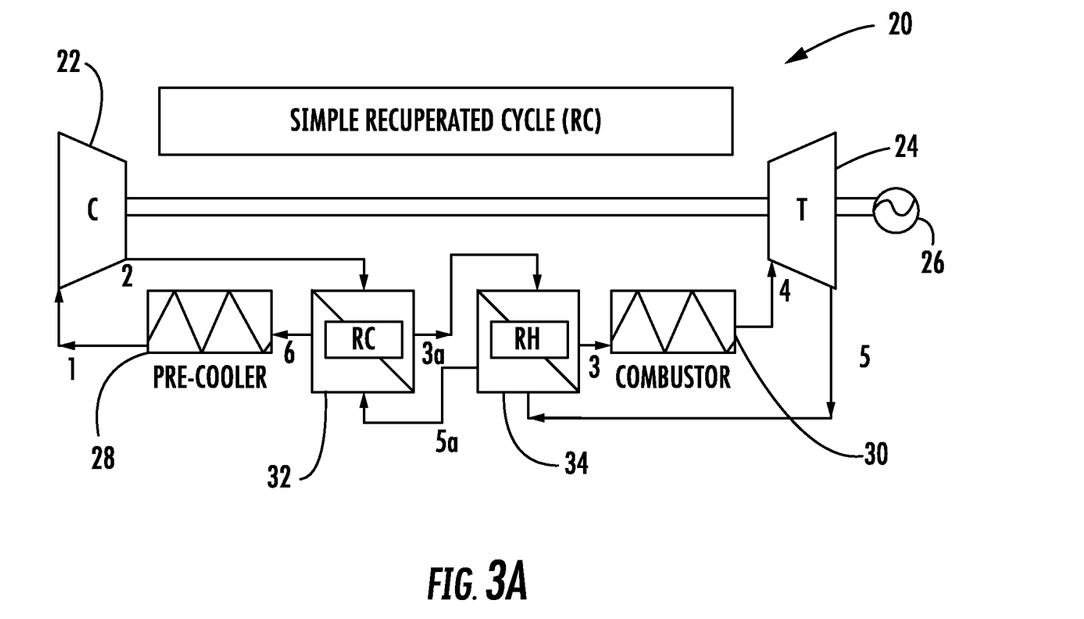
FIG. 3A is a simplified block diagram of a Simple Recuperated Cycle (RC) closed cycle power generation turbine system using the Brayton cycle in accordance with a non-limiting example.
Figure 3B:
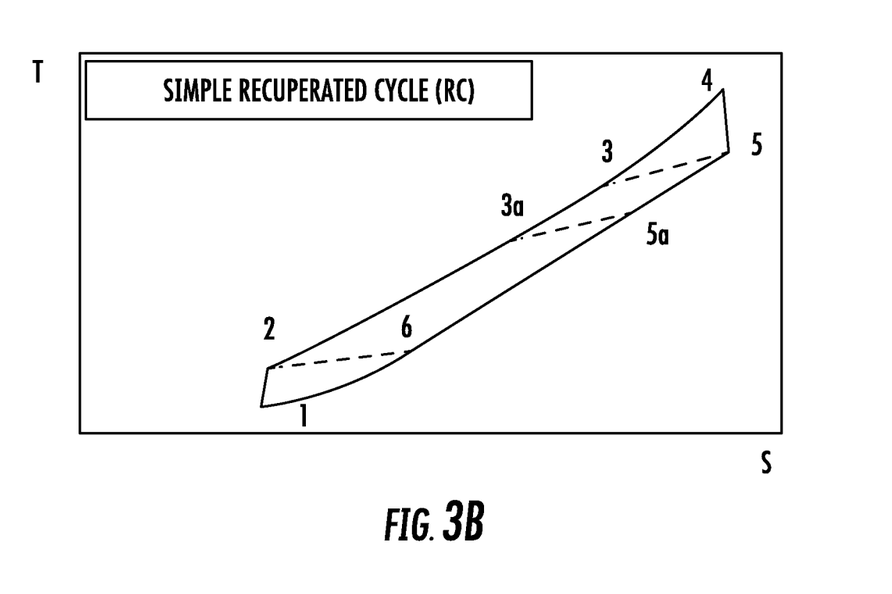
FIG. 3B is a graph showing the Simple Recuperated Cycle with temperature on the vertical axis and entropy on the horizontal axis.
Figure 4A:
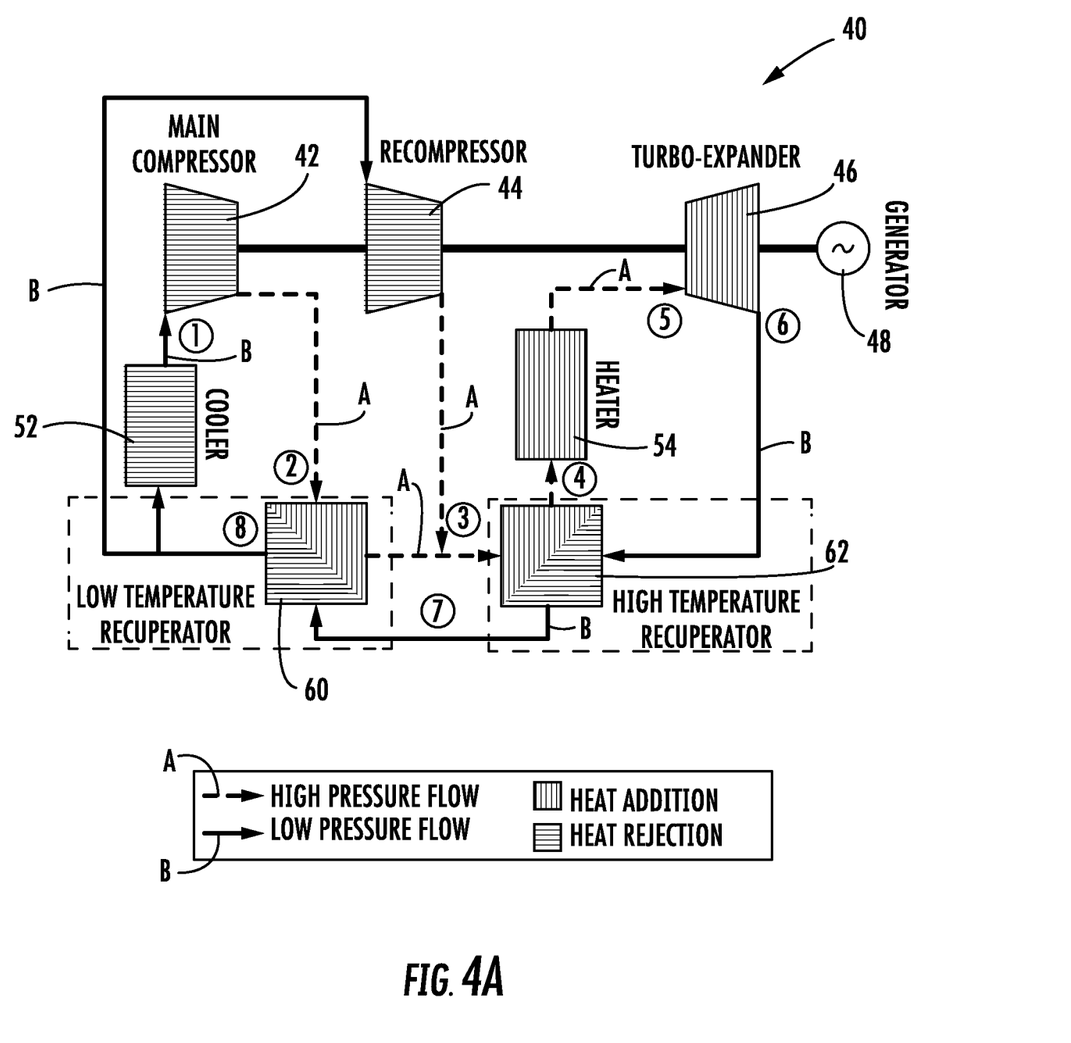
FIG. 4A is another block diagram showing a Recuperated Recompression Configuration (RRC) closed cycle power generation turbine system also using the Brayton cycle in accordance with a non-limiting example.
Figure 4B:
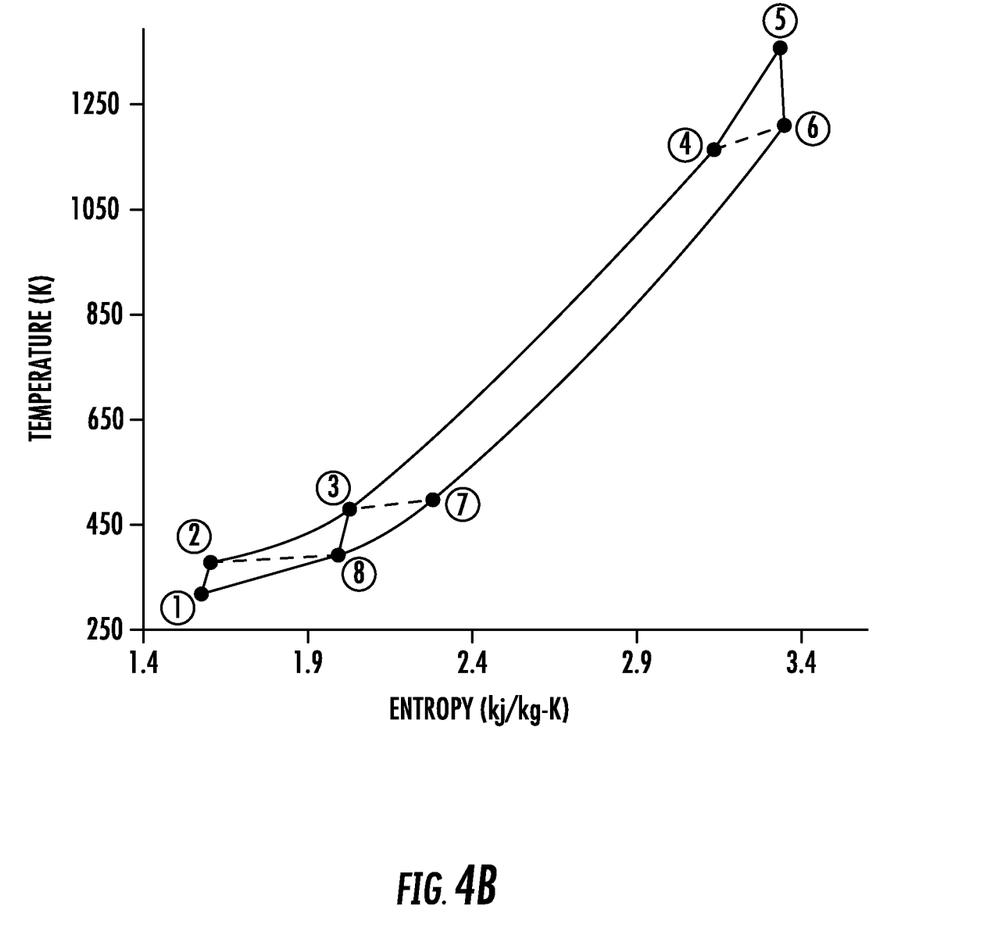
FIG. 4B is a graph of the Recuperated Recompression Configuration system with temperature in Kelvin on the vertical axis and the entropy in kJ/kg-K on the horizontal axis.

In a closed cycle power generation system employing supercritical carbon dioxide as the working fluid, either in a Simple Recuperated Configuration (RC), such as shown in FIGS. 3A and 3B, or in a Recuperated Recompression Configuration (RRC), as shown in FIGS. 4A and 4B, the recuperative heat recovery from the exhaust stream (RC: points 5 to 6; RRC: points 6 to 8) may be accomplished by applying a special gas to gas heat exchangers as recuperators having a robust design. Each recuperator, in accordance with a non-limiting example, has two inlets as a hot stream inlet and cold stream inlet and two outlets as a hot stream outlet and cold stream outlet. A high temperature recuperator generally has its hot stream inlet at the turbine exhaust and the cold stream inlet at a low temperature recuperator cold steam outlet. Its hot stream outlet is at the low temperature recuperator hot stream inlet and the cold stream outlet is at the heat receiver or heat collector or combustor depending on the exact application. With the low temperature recuperator, the hot stream inlet is at the high temperature recuperator hot stream outlet and the cold stream inlet is at the compressor exhaust or outlet. The hot stream outlet is at the pre-cooler or external heat rejection heat exchanger and cold steam outlet is at the high temperature recuperator cold stream inlet.

FIG. 3A shows a Simple Recuperated Cycle (RC) closed cycle power generation turbine system 20, in accordance with a non-limiting example, that uses supercritical carbon dioxide as the working fluid and showing the main compressor (C) 22 that interoperates with the turbo-expander or turbine (T) 24 to generate power at the generator 26. Other components include the pre-cooler 28, combustor 30, and other components such as low temperature and high temperature recuperators 32, 34 connected between the pre-cooler and combustor. A graph of the single recuperated cycle is shown in FIG. 3B. Various temperature and entropy stages for the operation of that simple recuperated cycle system are shown by the numbers and their sequence of FIGS. 3A and 3B. The graph of FIG. 3B is read in conjunction with the numerical sequence flow shown on the block diagram of FIG. 3A and illustrates the Brayton cycle different states and changing temperature and entropy.

FIG. 4A shows a Recuperated Recompression Configuration power generation turbine system 40, in accordance with a non-limiting example. The main compressor 42 is connected to a recompressor 44, which in turn connects to the turbo-expander or turbine 46, which in turn, connects to the generator 48. The cooler 52 to the main compressor 42 and heater 54 to the turbo-expander 46 are connected to a respective low temperature recuperator 60 and a high temperature recuperator 62. This drawing shows the high pressure and low pressure fluid flows. A graph of the output with the entropy and temperature is shown in FIG. 4B. Entropy is on the horizontal axis and the temperature in K is on the vertical axis. The numerals in the graph correspond to the numerals and state changes in the system 40 of FIG. 4A.

Figures 5A, 5B:
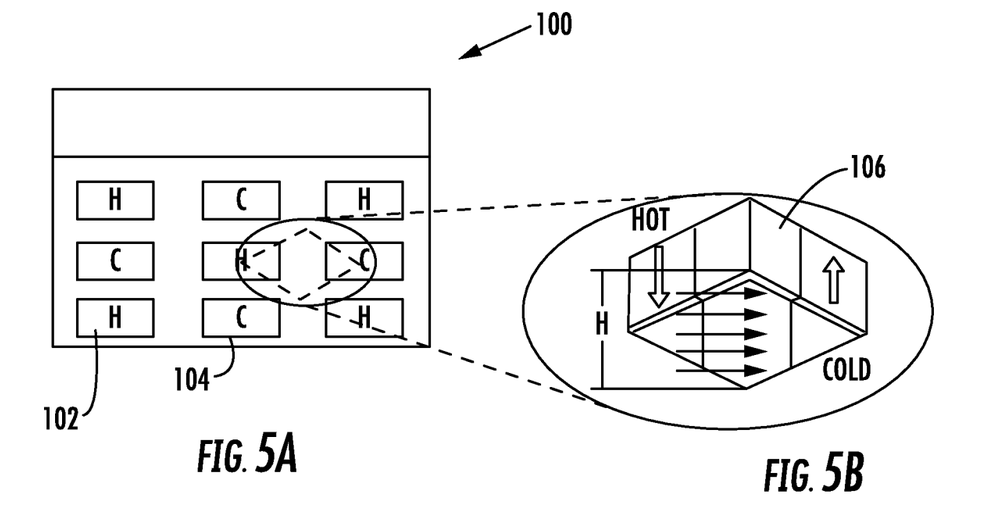
FIG. 5A is a fragmentary drawing view of a recuperator that operates as a heat exchanger in a power generation turbine system in accordance with a non-limiting example.
FIG. 5B is a fragmentary plan view of the recuperator section shown by the diamond in FIG. 5A in accordance with a non-limiting example.

The recuperator, in accordance with a non-limiting example, is an improvement over more general heat exchangers used as recuperators such as with power generation turbine systems shown in FIGS. 3A and 4A. The recuperator as described, in accordance with a non-limiting example, is given the general numerical designation in the 100 series. The recuperator 100 may be used in generation systems 20 and 40, such as shown in FIGS. 3A and 4A, and includes hot fluid channels 102 and cold fluid channels 104, which are arranged in a simple counterflow configuration as illustrated in FIGS. 5A and 5B. Central to this arrangement is the relative placement of hot and cold fluid channels 102, 104. Each flow channel 102, 104 is surrounded on four sides by the thermodynamically reciprocal type working fluid, i.e., hot versus cold and vice versa. A plurality of matrix panels 106 are interconnected together such as by diffusion bonds or other weld or joinder processes that may be applicable.

Figure 6:
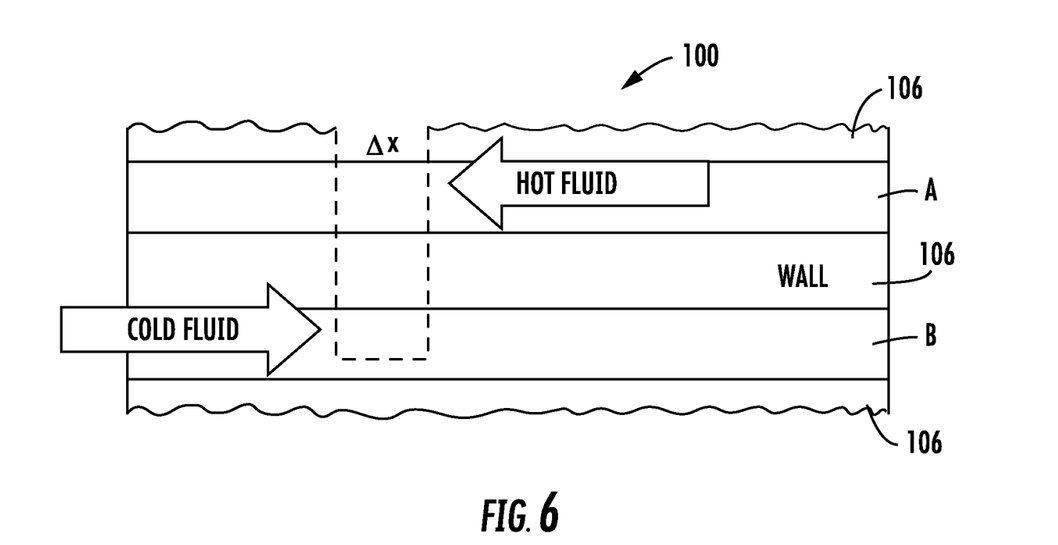
FIG. 6 is a partial sectional view of the recuperator in accordance with a non-limiting example.
Figure 7:
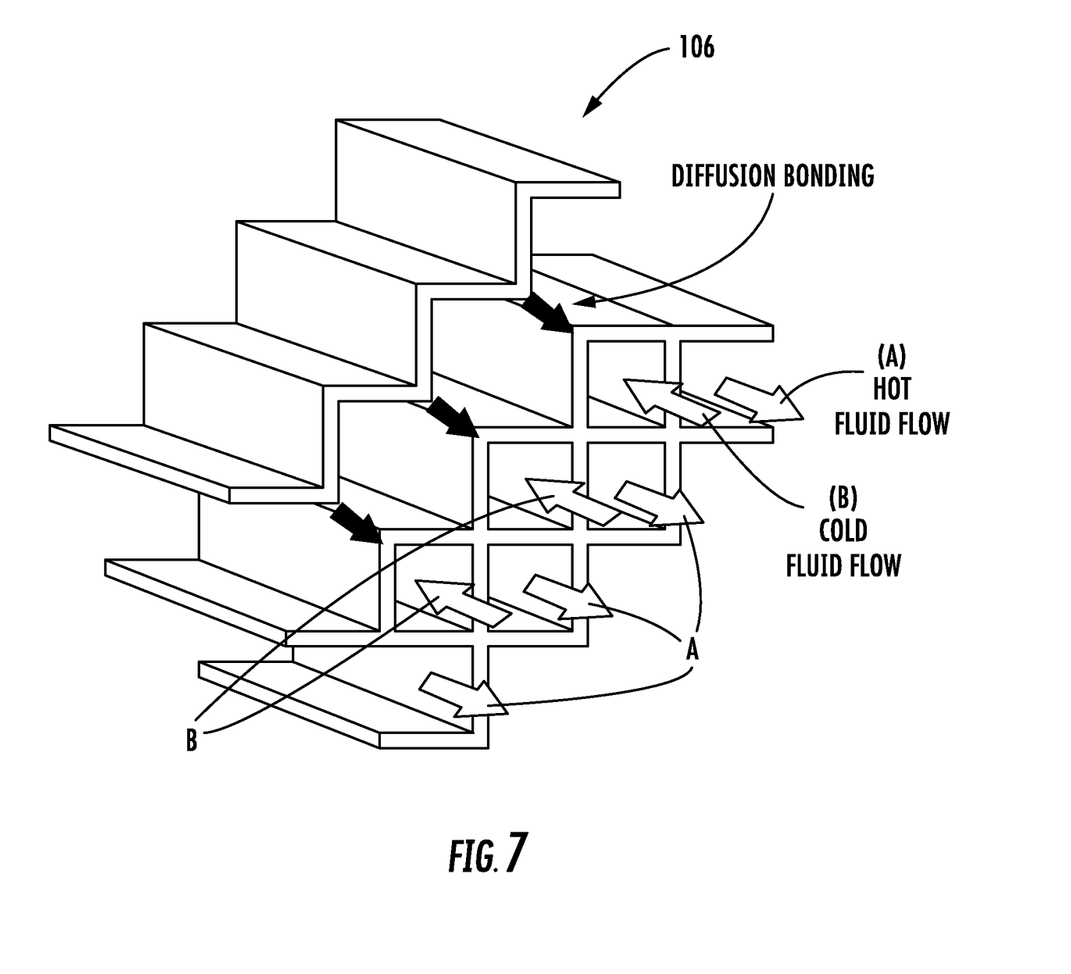
FIG. 7 is a fragmentary, isometric view of the recuperator channel walls in accordance with a non-limiting example and showing a rectangular configuration of fluid channels formed by the matrix panels that are diffusion bonded together.

FIGS. 5A and 5B show channels 102, 104 of the recuperator 100 with the normal heat exchange and the flow of hot fluid and cold fluid and the change shown as delta X and the wall configuration formed by the matrix panels 106. A sectional view in FIG. 6 shows the counterflow of hot and cold fluids. The rectangular fluid channel arrangement of the matrix panels 106 forming channel walls is shown in the fragmentary, isometric view of the recuperator 100 of FIG. 7. The matrix panels 106 may be diffusion bonded together in an example and the flow of hot and cold fluid is indicated. The structural arrangement facilitates this positioning of hot and cold fluid channels 102, 104 and bonding of matrix panels 106. The channel walls may be fabricated from the stair-step shaped matrix panels 106, which are joined by the appropriate diffusion bonding process or other bonding process known to those skilled in the art. In the application of high temperature metals such as nickel-based superalloys, one such fabrication process is the diffusion bonding of the metals using techniques known by those skilled in the art. In one non-limiting example, each layer of the "stair-step" design of the matrix panels 106 may be formed as a PDCC (polymer derived ceramics composite)/superalloy layer.

Figure 8A:
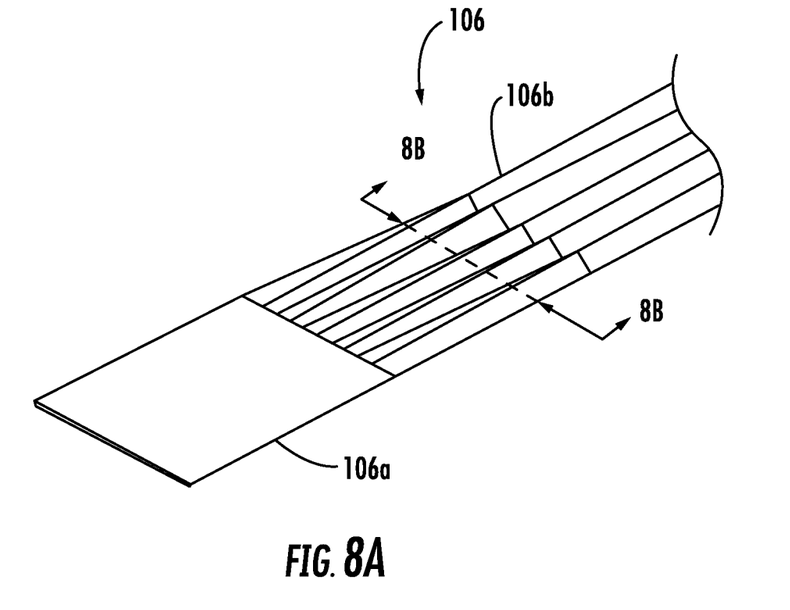
FIG. 8A is a fragmentary plan view of a matrix panel of the recuperator in accordance with a non-limiting example.
Figure 8B:
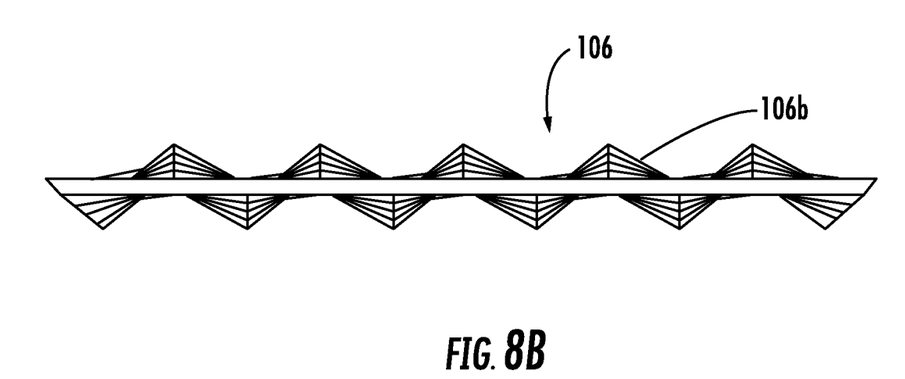
FIG. 8B is a sectional view of the matrix panel taken generally along line 8B-8B in FIG. 8A.

As shown in FIGS. 8A and 8B, each matrix panel 106 extends as a longitudinally extending panel or structural shape that includes at each end a flat section 106a to facilitate manifolds and headers and the medial section having the ridges and structure 106b for the channel, which can be configured when together in different shapes such as rectangular, elliptical, oval, or rhombus. Heat transfer may be enhanced by the wall configuration having ribs, dimples, or a roughed surface to create turbulence. Alternatively, the matrix panels 106 may be formed of fiber reinforced ceramic matrix composites, referred to as a class of fiber reinforced polymer derived ceramic (PDC) composites, which have exceptional strength and fracture toughness at high temperatures. Such fiber reinforced PDC composites may be developed through stepwise processing using a pre-preg of selected continuous fibers with PDC resins. In an example, the PDC composite laminates are processed in an autoclave by applying precise curing cycles, i.e., temperature, pressure and vacuum level, to form a greenware product, which is pyrolized to form a preliminary product. This preliminary product is densified through repeated cycles of infiltration and pyrolysis, and then post-machined to form the finished PDC composites product.

Figure 9:
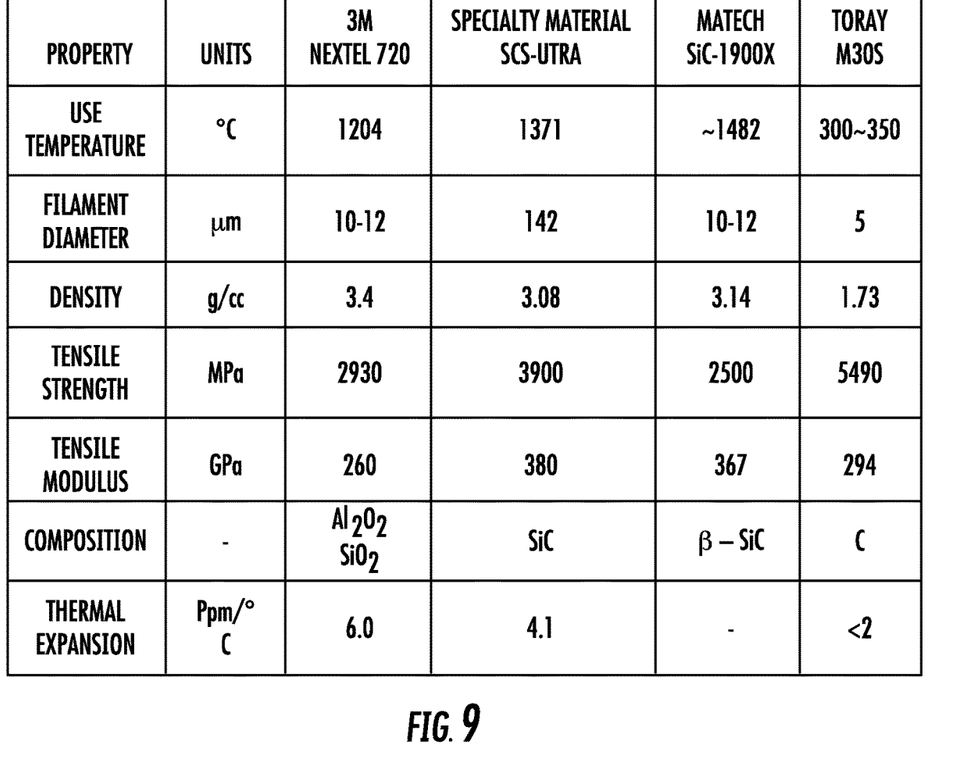
FIG. 9 is a table showing fiber properties used in PDC composites for the matrix panel of the recuperator in accordance with a non-limiting example.
Figure 10:
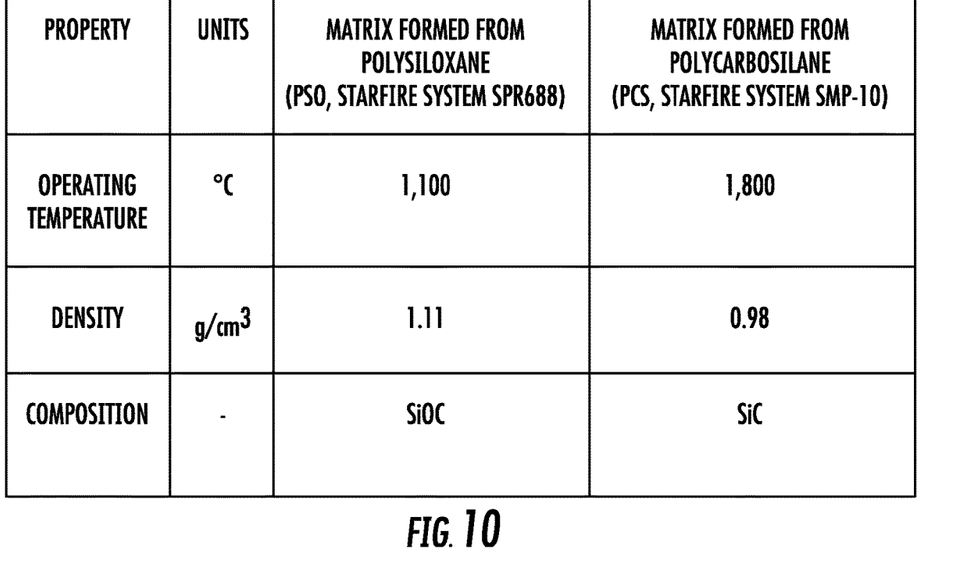
FIG. 10 is a table showing matrix properties used in the PDC composites for the matrix panel used in the recuperator in accordance with a non-limiting example.

FIG. 9 is a table showing properties of various kinds of fibers used for PDC composites manufacturing and can be used in accordance with non-limiting examples for the matrix panels 106. The tensile strengths are greater than twice that of superalloys at operating temperatures more than 1,000° F. higher than superalloy application levels. FIG. 10 is a chart showing the matrix properties used for PDC composites manufacturing and application in microchannel recuperators and matrix panels.

This design as generally described above enables modular construction of recuperators 100 having the micro-channels with a high level of robustness to withstand high pressure in S—CO$_2$ power plants. They are readily scalable up to any size with little or no redesign of the entire recuperator system 100. They are also easy to manufacture because of its simplicity in design. It is estimated this the design will decrease manufacturing costs significantly. This design also ensures natural separation of the hot and cold fluids, thus eliminating any fluid leakage and mixing between hot and cold fluids. In this design, fusion welding may be used to hold the panel layers together. On each end of the heat exchanger as a recuperator, the individual matrix panels will straighten at the location, where the hot and cold fluids exit or enter in a direction diagonal to the original square configuration, so as to maintain a counterflow configuration. In this design, each square channel carrying hot or cold fluid is surrounded by four channels on four sides carrying the other fluid.

Figure 11A:
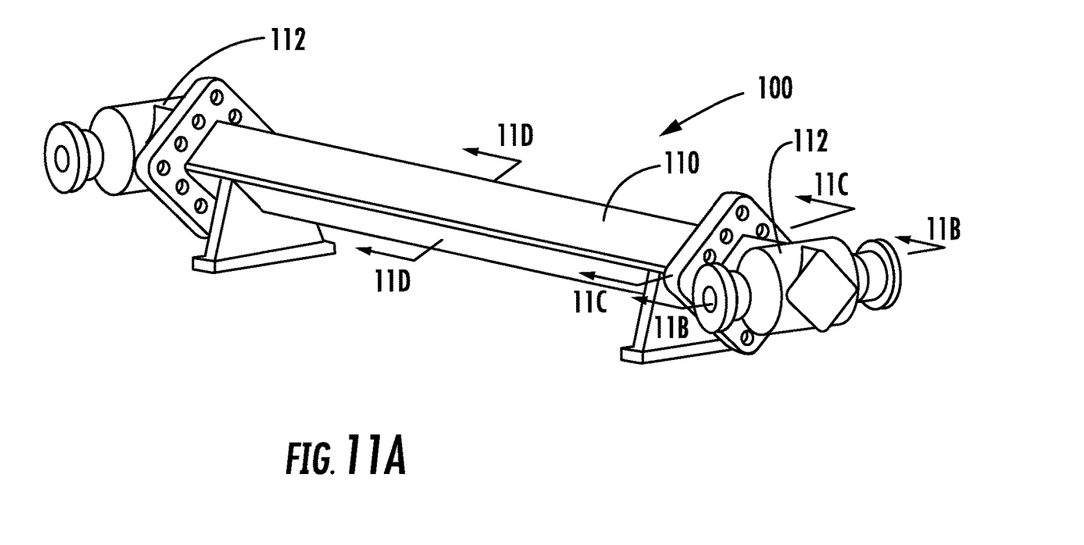
FIG. 11A is an isometric view of an example recuperator in accordance with a non-limiting example.
Figure 11B:
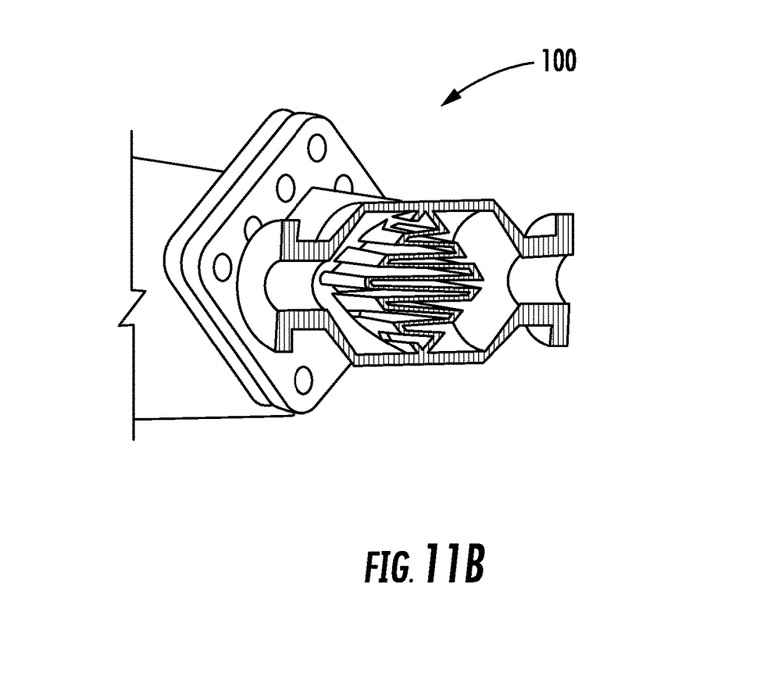
FIG. 11B is an isometric view of the example recuperator with a section cut along line 11B-11B in FIG. 11A.
Figure 11C:
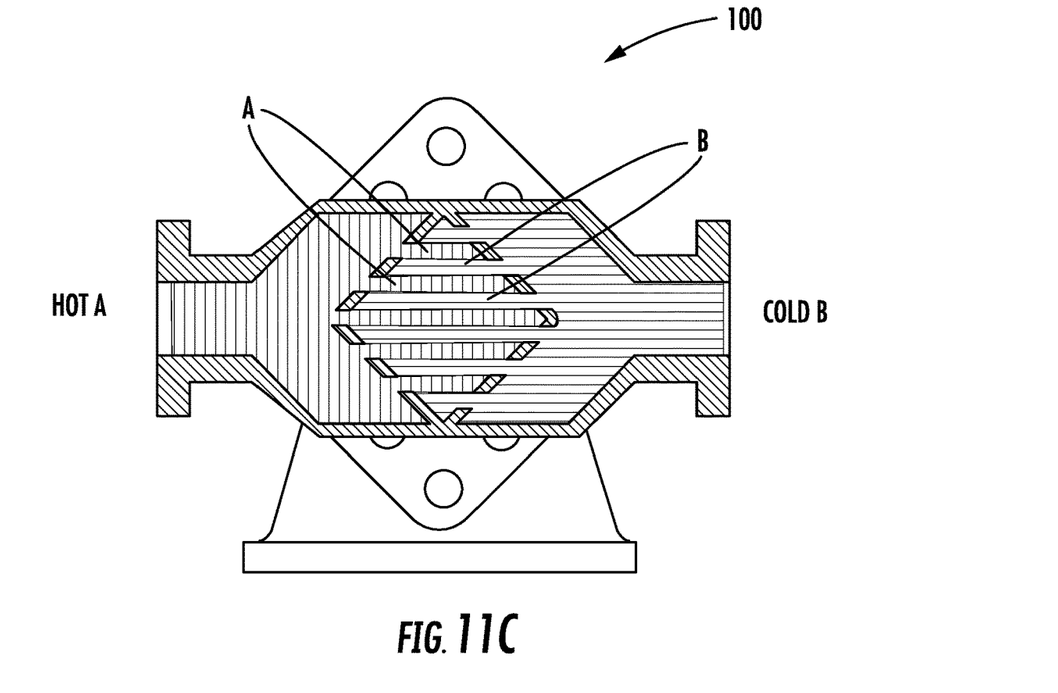
FIG. 11C is a sectional view taken along line 11C-11C in FIG. 11A.
Figure 11D:
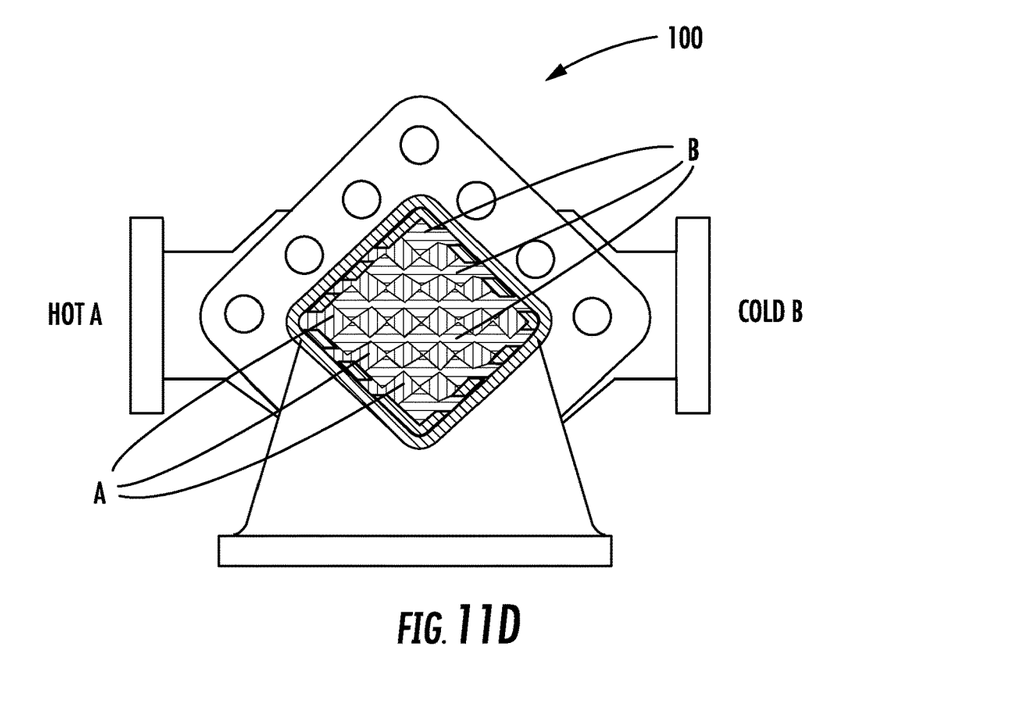
FIG. 11D is a sectional view taken along the medial section line 11D-11D in FIG. 11A.

FIG. 11A is an isometric view of the recuperator 100 and showing a rectangular configured channel housing connected to couplers 112 for inlet and outlets and showing an isometric view of FIG. 11B with a section in its front along line 11B-11B. A sectional view is shown in FIG. 11C along line 11C-11C and a medial sectional view in FIG. 11D taken along line 11D-11D. These figures show the respective rectangular configuration and four channels on four sides carrying the other respective cold or hot fluids.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A power generation system, comprising:
a compressor having an inlet and outlet, a recompressor connected to the outlet of the compressor, and a turbine connected to the recompressor and having an outlet and inlet, and a heat combustor connected to the inlet of the turbine and a heat exchanger connected to the inlet of the compressor;
a high temperature recuperator and a low temperature recuperator, each of said recuperators having a hot stream inlet and cold stream inlet and a hot stream outlet and cold stream outlet, wherein the hot stream inlet of the high temperature recuperator is connected to the outlet of the turbine and the cold stream inlet of the high temperature recuperator is connected to the cold stream outlet of the low temperature recuperator, and the hot stream outlet of the high temperature recuperator is connected to the hot stream inlet of the low temperature recuperator and the cold stream outlet of the low temperature recuperator is connected to the heat combustor, and wherein the cold stream inlet of the low temperature recuperator is connected to the outlet of the compressor and the hot stream outlet of high temperature recuperator is connected to the heat exchanger;
wherein said high and low temperature recuperators each comprise a plurality of matrix panels each formed of fiber reinforced polymer derived ceramic composite interconnected together and defining hot fluid microchannels and cold fluid microchannels arranged adjacent to each other in a counterflow and stair-step configuration; and further comprising a diffusion bond between adjacent matrix panels that secures respective adjacent matrix panels together, wherein each recuperator defines a longitudinal axis and an inlet and outlet end along the longitudinal axis, and said matrix panels extend in a direction diagonal to the longitudinal axis and straighten at the inlet and outlet end.

2. The power generation system according to claim 1 wherein said matrix panels are interconnected together to define the hot and cold fluid microchannels in each of said high and low temperature recuperators as geometrically shaped in either a rectangular, elliptical, oval or rhombus configuration.

3. The power generation system according to claim 1 wherein said each of said respective hot or cold fluid microchannels is surrounded by fluid channels carrying the respective other cold or hot fluid.

4. The power generation system according to claim 3 wherein a plurality of the respective hot or cold fluid microchannels is surrounded by four microchannels on four sides carrying the other respective cold or hot fluid.

5. The power generation system according to claim 1 wherein each matrix panel comprises polysiloxane or polycarbosilane.

6. A power generation system, comprising:
a compressor having an inlet and outlet, a recompressor connected to the outlet of the compressor, and a turbine connected to the recompressor and having an outlet and inlet, and a heat combustor connected to the inlet of the turbine and a heat exchanger connected to the inlet of the compressor;
a high temperature recuperator and a low temperature recuperator, each of said recuperators having a hot stream inlet and cold stream inlet and a hot stream outlet and cold stream outlet, wherein the hot stream inlet of the high temperature recuperator is connected to the outlet of the turbine and the cold stream inlet of the high temperature recuperator is connected to the cold stream outlet of the low temperature recuperator, and the hot stream outlet of the high temperature recuperator is connected to the hot stream inlet of the low temperature recuperator and the cold stream outlet of the low temperature recuperator is connected to the heat combustor, and wherein the cold stream inlet of the low temperature recuperator is connected to the outlet of the compressor and the hot stream outlet of high temperature recuperator is connected to the heat exchanger;
wherein said high and low temperature recuperators each comprise a plurality of matrix panels each formed of fiber reinforced polymer derived ceramic composite interconnected together and defining hot fluid microchannels and cold fluid microchannels arranged adjacent to each other in a counterflow and stair-step configuration, and further comprising a diffusion bond between adjacent matrix panels that secures respective adjacent matrix panels together, wherein each recuperator defines a longitudinal axis and an inlet and outlet end along the longitudinal axis, and said matrix panels extend in a direction diagonal to the longitudinal axis and straighten at the inlet and outlet end, wherein each of the hot or cold fluid microchannels are surrounded by fluid microchannels carrying the respective other cold or hot fluid and geometrically shaped in either a rectangular, elliptical, oval or rhombus configuration.

7. The power generation system according to claim 6 wherein a plurality of the hot or cold fluid microchannels is surrounded by four microchannels on four sides carrying the other respective cold or hot fluid.

8. The power generation system according to claim 6 wherein each matrix panel comprises polysiloxane or polycarbosilane.

* * * * *